United States Patent [19]

Ramlow et al.

[11] 3,953,393

[45] Apr. 27, 1976

[54] LOW TEMPERATURE PROCESS FOR THE PREPARATION OF GRAFT COPOLYMER DISPERSIONS

[75] Inventors: Gerhard G. Ramlow, Ludwigshafen, Germany; Louis C. Pizzini, Trenton; John T. Patton, Jr., Wyandotte, both of Mich.

[73] Assignee: BASF Wyandotte Corporation, Wyandotte, Mich.

[22] Filed: Jan. 7, 1974

[21] Appl. No.: 431,081

[52] U.S. Cl. .................. 260/31.8 R; 260/31.8 HR; 260/31.8 AN; 260/33.2 R; 260/33.4 R; 260/33.4 UR; 260/34.2; 260/75 NA; 260/77.5 CR; 260/859 R; 260/859 PV; 260/861; 260/865; 260/869; 260/870; 260/875; 260/881; 260/884; 260/886
[51] Int. Cl.$^2$................... C08K 5/06; C08K 5/10; C08L 51/08; C08L 67/06
[58] Field of Search............ 260/465.9, 670, 669 R, 260/656 R, 488 H, 491, 865, 870, 875, 881, 34.2, 861, 857 G, 859 R, 859 PV, 33.2 R, 33.4 R, 33.40 R, 31.8 HR, 31.8 AN

[56] References Cited
UNITED STATES PATENTS

| | | | |
|---|---|---|---|
| 3,095,388 | 6/1963 | Osmond et al. | 260/34.2 |
| 3,257,340 | 6/1966 | Osmond | 260/34.2 |
| 3,383,351 | 5/1968 | Stamberger | 260/33.2 |
| 3,607,821 | 9/1971 | Clarke et al. | 260/34.2 |
| 3,652,639 | 3/1972 | Pizzini et al. | 260/465.4 |
| 3,823,201 | 7/1974 | Pizzini et al. | 260/861 |

FOREIGN PATENTS OR APPLICATIONS

| | | | |
|---|---|---|---|
| 1,126,025 | 9/1968 | United Kingdom | 260/465.9 |
| 1,063,222 | 3/1967 | United Kingdom | 260/465.9 |

OTHER PUBLICATIONS

Vollmert, Polymer Chemistry, 1973, pp. 65–69.

*Primary Examiner*—Allan Lieberman
*Attorney, Agent, or Firm*—Joseph D. Michaels; Bernhard R. Swick; Robert E. Dunn

[57] ABSTRACT

Graft copolymer dispersions of improved viscosity and superior particle size distribution are prepared by the in situ polymerization of vinyl monomers in unsaturation-containing polyols in the presence of a free-radical catalyst and certain chain transferring agents at temperatures below 100°C. The dispersions are low viscous liquids which may be advantageously employed in the preparation of polyurethanes.

8 Claims, No Drawings

LOW TEMPERATURE PROCESS FOR THE PREPARATION OF GRAFT COPOLYMER DISPERSIONS

BACKGROUND OF THE INVENTION

1. Field of the Invention

The present invention relates to a process for the preparation of stable graft copolymer dispersions of low viscosity and superior particle size distribution. More particularly, the invention relates to the in situ polymerization at a temperature below 100°C. of vinyl monomers in a co-reactive unsaturation-containing polyol in the presence of a free radical catalyst and a chain transferring agent.

2. Prior Art

Graft copolymer dispersions prepared from vinyl monomers and unsaturation-containing polyether polyols and the use thereof in the preparation of polyurethane polymers are well known in the art as evidenced by U.S. Pat. No. 3,652,659 as well as British Pat. No. 1,063,222. These patents disclose various methods of preparing graft copolymer dispersions. All of the patents relate to the problem of high viscosities. As a general rule, in order to obtain efficient grafting in the presence of free-radical catalysts, the in situ polymerization is carried out at temperatures between 100°C.–130°C. and employing high (over 2% by weight of the vinyl monomers) concentration of catalyst. These high temperatures do considerable damage to sensitive monomers such as acrylonitrile and vinylidene chloride as well as to the polyols, resulting in colored dispersions. The present invention relates to an improvement in the preparation of graft copolymer dispersions prepared in unsaturation-containing polyols.

SUMMARY OF THE INVENTION

The present invention is an improvement in the preparation of graft copolymer dispersions by the in situ polymerization of a vinyl monomer in an unsaturation-containing polyol in the presence of a free-radical catalyst which comprises conducting the polymerization at a temperature below 100°C. in the presence of from 0.1 weight percent to 2 weight percent based on the weight of the monomer of a chain transferring agent. The resulting dispersions are superior to those prepared in accordance with the processes of the prior art in regard to their low viscosity, their reduced content of agglomerated particles and their narrow particle size distribution. These properties render the dispersions particularly useful in the preparation of urethane foams having enhanced physical properties.

DESCRIPTION OF THE PREFERRED EMBODIMENT

In accordance with the present invention, graft copolymer dispersions are prepared by the in situ polymerization of vinyl monomers in an unsaturation-containing polyol, said polymerization being carried out at a temperature below 100°C. in the presence of a freeradical catalyst and an alkyl mercaptan chain transferring agent.

Vinyl monomers which may be employed in the process of the subject invention are those which contain ethylenic unsaturation. Representative monomers include butadiene, isoprene, 1,4-pentadiene, 1,6-hexadiene, 1,7-octadiene, styrene, α-methylstyrene, methylstyrene, 2,4-dimethyl-styrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoro-methylstyrene, iodostyrene, cyanostyrene, nitrostyrene, N,N-dimethylaminostyrene, acetoxylstyrene, methyl 4-vinyl-benzoate, phenoxystyrene, p-vinyl diphenyl sulfide, p-vinylphenyl phenyl oxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetaminoacrylate, butyl acrylate, ethyl acrylate, 2-ethylhexylacrylate, phenyl acrylate, phenyl methacrylate, α-chloroacrylonitrile, N,N-dimethylacrylamide, N,N-dibenzyl-acrylamide, N-butylacrylamide, methacrylyl formamide, and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl methoxy acetate, vinyl benzoate, vinyl iodide, vinyl toluene, vinyl naphthalene, vinyl bromide, vinyl chloride, vinyl fluoride, vinylidene bromide, vinylidene chloride, 1-chloro-1-fluoro-ethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phosphonates such as bis (β-chloroethyl)vinyl phosphonate, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention. The amount of ethylenically unsaturated monomer employed in the polymerization reaction is generally from 1% to 30%, preferably from 3% to 25%, based on the weight of the polyol.

Illustrative catalysts which may be employed in the present invention are the well-known free-radical type of vinyl polymerization catalysts, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-α-cumyl peroxide, dipropyl peroxide, diiso-propyl peroxide, isopropyl-t-butyl peroxide, butyl-t-butyl peroxide, dilauroyl peroxide, difuroyl peroxide, ditriphenylmethyl peroxide, bis(p-methoxybenzoyl)peroxide, p-monomethoxybenzoyl peroxide, rubrene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-Decalin hydroperoxide, α-methylbenzyl hydroperoxide, α-methyl-α-ethylbenzyl hydroperoxide, Tetralin hydroperoxide, triphenylmethyl hydroperoxide, diphenylmethyl hydroperoxide, α-β-azo-2-methyl butyro-nitrile, α,α'-2-methyl heptonitrile, 1,1'-azo-1-cyclo-hexane carbonitrile, dimethyl-α, α'-azoisobutyrate, 4,4'-azo-4-cyanopentanoic acid, azobis-(isobutyronitrile), persuccinic acid, diisopropyl peroxy dicarbonate, and the like; a mixture of catalysts may also be used. Azobis(isobutyronitrile) is the preferred catalyst. Since the polymerization process of the subject invention is carried out at temperatures between 30°C. and 100°C., preferably from 60°C. to 90°C., temperatures at which the above catalysts have a long half-life time, smaller amounts of catalysts than are generally used in making graft cpolymer dispersions are suitable in the invention. Generally from about 0.05% to about 5%, preferably from about 0.1% to about 1%, by weight of catalyst based on the weight of the monomer will be employed in the process of the invention.

An essential reactant in the process of the subject invention is an unsaturation-containing polyol. By the phrase "unsaturation-containing polyol" is meant a compound containing reactive hydroxyl groups and an unsaturated group which is co-reactive with the vinyl monomer employed. This polyol may be prepared by the reaction of any conventional polyol with an organic compound having both ethylenic unsaturation and a hydroxyl, carboxyl or epoxy group. Alternatively, the polyols can be prepared by employing as a reactant in the preparation of the polyol a compound having both ethylenic unsaturation and a hydroxyl, carboxyl or epoxy group. Representative of such organic compounds include unsaturated polycarboxylic acids and anhydrides such as maleic acid and anhydride, fumaric acid and anhydride, crotonic acid and anhydride, propenyl succinic anhydride, and halogenated maleic acids and anhydrides, unsaturated polyhydric alcohols such as 2-butene-1,4-diol, glycerol allylether, trimethylolpropane allylether, pentaerythritol allylether, pentaerythritol vinylether, pentaerythritol diallylether, and 1-butene-3,4-diol, unsaturated epoxides such as 1-vinylcyclohexane-3,4-epoxide, butadiene monoxide, vinyl glycidylether(1-vinyloxy-2,3-epoxy propane), glycidyl methacrylate and 3-allyloxypropylene oxide (allyl glycidyl-ether). If a polycarboxylic acid or anhydride is employed to incorporate unsaturation into the polyols, it is then necessary to react the unsaturated polyol with an alkylene oxide, preferably ethylene or propylene oxide, to replace the carboxyl groups with hydroxyl groups prior to employment in the present invention. The amount of alkylene oxide employed is such to reduce the acid number of the unsaturated polyol to about molecular or less.

To prepare the unsaturation-containing polyols of use in the present invention, from about 0.1 mole to about 3.0 moles, preferably from 0.30 mole to 1.5 moles, of said organic compound per mole of polyol is employed. Polyols containing relatively low unsaturation can also be prepared by blending a high unsaturation-containing polyol with a polyol which is free of ethylenic unsaturation. If a blend of polyols is employed, the amount of unsaturation should fall within the range stated above. The preparation of the unsaturation-containing polyols employed in the present invention follows conventional prior art procedures such as disclosed in U.S. Pat. No. 3,275,606 and U.S. Pat. No. 3,280,077. Generally this requires a reaction at a temperature between 0°C. and 130°C. Both acidic catalysts, such as Lewis acid catalysts and basic catalysts such as alkali metal hydroxides, may be used. In addition, a non-catalyzed reaction may be used employing temperatures between 50°C. and 200°C. It is, of course, understood that the resulting polyols are a cogeneric mixture of polyols and not a single molcular structure.

Representative polyols which may be employed in the preparation of the unsaturation-containing polyols employed in the present invention are well known in the art. They are often prepared by the catalytic condensation of an alkylene oxide or mixture of alkylene oxides either simultaneously or sequentially with an organic compound having at least two active hydrogen atoms such as evidenced by U.S. Pat. No. 1,922,451; 3,190,927 and 3,346,557.

Representative polyols include polyhydroxyl-containing polyesters, polyalkylene polyether polyols, polyhydroxy-terminated polyurethane polymers, polyhydroxyl-terminated polycaprolactone polyesters, polyhydroxyl-containing phosphorus compounds, and alkylene oxide adducts of polyhydric polythioethers, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used such as amino alcohols which contain an amino group and a hydroxyl group. Also alkylene oxide adducts of compounds which contain one —SH group and one —OH group as well as those which contain an amino grup and a —SH group may be used. Generally the equivalent weight of the polyols will vary from 500 to 20,000, preferably from 1000 to 5000.

Any suitable hydroxyl-containing polyester may be used such as are obtained from polycarboxylic acids and polyhydric alcohols. Any suitable polycarboxylic acid may be used such as oxalic acid, malonic acid, succinic acid, glutaric acid, dipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethylsuccinic acid, isophthalic acid, terephthalic acid, hemimellitic acid, and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol, and sorbitol. Also included with the term "polyhydric alcohol" are compounds derived from phenol such as 2,2-bis(4-hydroxyphenyl)-propane, commonly known as Bisphenol A.

Any suitable polyalkylene polyether polyol may be used such as the polymerization product of an alkylene oxide or of an alkylene oxide with a polyhydric alcohol having from 2 to 6 hydroxyl groups. Any suitable polyhydric alcohol may be used such as those disclosed above for use in the preparation of the hydroxyl-containing poly-esters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide tetrahydrofuran copolymers; epihalehydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by ay know process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-(4,4'-hydroxyphenyl)propane and blends thereof having equivalent weights of from 250 to 5000.

Suitable polyhydric polythioethers which may be condensed with alkylene oxides include the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxylcontaining polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72% to about 95%.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkane thiols containing at least two —SH groups such as 1,2-ethane dithiol, 1,2-propane dithiol, 1,3-propane dithiol, and 1,6-hexane dithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-amino aniline, 1,5-diamino naphthalene, methylene dianiline, the condensation products of aniline and formaldehyde, and 2,4-diamino toluene; aliphatic amines such as methylamine, triisopropanolamine, ethylenediamine, 1,3-propylenediamine, 1,4-butylenediamine, and 1,3-butylenediamine.

According to the present invention, rather low concentrations of unsaturation (less than one mole per mole of polyol) can advantageously be used. In other words, not every molecule in the polyol has to carry unsaturation. Consequently, low levels of unsaturation-containing polyols can be prepared by blending small amounts of high unsaturation-containing polyols (e.g., one mole or more) with polyols essentially free from unsaturation. The unsaturation-carrying polyol does not necessarily have to be derived from the same polyol as the polyol essentially free from unsaturation. To the contrary, it has often been found to be advantageous to use an unsaturated polyol with a considerably higher molecular weight. It is important to remember that when a mixture of an unsaturation-containing polyol and a polyol is employed in the subject invention, the polyols must be compatible with each other, that is, for instance high oxypropylene-containing polyols should be employed with high oxypropylene-containing unsaturation-containing polyols. If a mixture of polyols is employed the amount of unsaturation-containing polyol should be from 5% to 100%, preferably from 5% to 50%, by weight of the total polyol reactant.

As mentioned above, the process of the subject invention is carried out in the presence of an alkyl mercaptan chain transferring agent. Generally from about 0.1% by weight to 2% by weight of chain transferring agent based on the weight of the vinyl monomer will be used in the invention. Alkyl mercaptans having from one to twenty carbon atoms in the alkyl chain may be employed in the present invention. Representative mercaptans include ethyl mercaptan, propyl mercaptan, butyl mercaptan, hexyl mercaptan, octyl mercaptan, decyl mercaptan, dodecyl mercaptan, tetradecyl mercaptan, cetyl mercaptan, and stearyl mercaptan.

The polymerization reaction of the subject invention may be carried out in several ways. Since the polymerization is carried out at temperatures below 100°C., a preferred embodiment of the invention is to charge all components to a reactor and apply heat thereto. Optionally, the reaction may be carried out by simultaneously adding at a steady or constant rate, the monomer and catalyst to the polyol reactant. Also, a portion of the catalyst, chain transferring agent and monomer may be dispersed in a portion of the polyol and added to a reaction vessel containing the remaining portion of the reactants, catalyst and chain transferring agent. In addition, the catalyst, chain transferring agent and monomer may be combined optionally with a portion of the polyol in a mixing device and thereafter added to a reaction vessel containing the remaining polyol.

In another embodiment of the present invention, the foregoing graft copolymer dispersions are employed in the preparation of polyurethane compositions, particularly polyurethane foams. The resulting polyurethane products exhibit marked improvements in load-bearing properties and tensile strength without substantial impairment of the other physical properties of the products. The polyurethane products are generally prepared by the reaction of the graft copolymer dispersions with an organic polyisocyanate, optionally in the presence of additional polyhydroxyl-containing components, chain-extending agents, catalysts, surface-active agents, stabilizers, blowing agents, fillers and pigments. Suitable processes for the preparation of cellular polyurethane plastics are disclosed in U.S. Pat. No. 24,514 Re. together with suitable machinery to be used in conjunction therewith. When water is added as the blowing agent, corresponding quantities of excess isocyanate to react with the water and produce carbon dioxide may be used. It is also possible to proceed with the preparation of the poly-urethane plastics by a prepolymer technique wherein an excess of organic polyisocyanate is reacted in a first step with the polyol of the present invention to prepare a prepolymer having free isocyanate groups which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichloro-difluoromethane, trichlorofluoromethane, dichlorodifluoro-ethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, tolylene-2,4-diisocyanate, tolylene-2,6-diisocyanate, mixtures of 2,4- and 2,6-hexamethylene-1,6-diisocyanate, tetramethylene-1,4-diisocyanate, cyclo-hexane-1,4-diisocyanate, hexahydrotolylene diisocyanate (and isomers), naphthylene-1,5-diisocyanate, 1-methoxy-phenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4'-triphenylmethane triisocyanate, polymethylene polyphenylisocyanate and tolylene 2,4,6-triisocyanate; and the tetraisocyanates such as 4,4'-dimethyldiphenylmethane-2,2',5,5'-tetraisocyanate. Especially useful due to their availability and properties are tolylene diisocyanate, diphenylmethane-4,4'-diisocyanate and polymethylene polyphenylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Pat. No. 3,215,652.

As mentioned above, the graft copolymer dispersions are preferably employed along with another polyhydroxyl-containing component commonly employed in the art. Any of the polyhydroxyl-containing components which are described above for use in the preparation of the graft copolymer dispersions of the present invention may be employed along with the unsaturated polyols in the preparation of the polyurethane compositions of the present invention.

Chain-extending agents which may be employed in the preparation of the polyurethane compositions of the present invention include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water and primary and secondary diamines which react more readily with the prepolymer than does water such as phenylenediamine, 1,4-cyclohexane-bis-(methyl-amine), ethylenediamine, diethyletriamine, N-(2-hydroxy-propyl)ethylenediamine, N,N'-di(2-hydroxypropyl)ethylene-diamine, piperazine, 2-methylpiperazine, morpholine, and dodecahydro-1,4,7-9b-tetrazaphenalene.

Any suitable catalyst may be used including tertiary amines, such as for example, triethylediamine, N-methyl morpholine, N-ethyl morpholine, diethyl ethanol-amine, N-coco morpholine, 1-methyl-4-dimethylamino ethyl piperazine, 3-methoxy-N-dimethyl propylamine, N-dimethyl-N'-methyl isopropyl propylenediamine, N,N-diethyl-3-diethylamino propylamine, dimethylbenzylamine, and the like. Other suitable catalysts are, for example, tin compounds such as stannous chloride, tin salts of carboxylic acids, such as dibutyltin di-2-ethyl hexoate, tin alcoholates such as stannous octoate, as well as other organometallic compounds such as are disclosed in U.S. Pat. No. 2,846,408.

A wetting agent or surface-active agent is generally necessary for production of high grade poly-urethane foam according to the present invention since in the absence of same the foams collapse or contain very large uneven cells. Numerous wetting agents have been found satisfactory. Nonionic surfactants and wetting agents are preferred. Of these, the nonionic surfaceactive agents prepared by the sequential addition of propylene oxide and then ethylene oxide to propylene glycol and the solid or liquid organosilicones have been found particularly desirable. Other surface-active agents which are operative, although not preferred, include poly-ethylene glycol ethers of long chain alcohols, tertiary amine or alkylolamine salts of long chain alkyl acid sulfate esters, alkyl sulfonic esters, and alkyl aryl-sulfonic acids.

The following examples illustrate the nature of the invention. All parts are by weight unless otherwise stated. In the examples, the physical properties of the polyurethane were determined by the following ASTM tests:

| | |
|---|---|
| Tensile Strength | D-412 |
| Elongation | D-412 |
| Split Tear | D-470 |
| Compression Set | D-395 |
| Compression Load | D-1564 |

EXAMPLES I-IX

A. Preparation Of An Unsaturated Polyether-Ester Polyol

A stainless steel autoclave equipped with a thermometer, stirrer, nitrogen source, inlet means and heat exchange means was charged with 4800 parts of a 4800 molecular weight polyol prepared by the reaction of ethylene oxide with the reaction product of propylene oxide with glycerol and propylene glycol (mole ratio of glycol to propylene glycol of 3.2:1), said polyol having an ethylene oxide content of 13% by weight of the polyol and a hydroxyl number of 35. The charge was purged with nitrogen and heated to 175°C. With constant stirring, 98 parts of maleic anhydride was then added to the charge maintaining the temperature of the charge at 175°C. for fifteen minutes. Then, 264 parts of ethylene oxide was gradually added to the reaction mixture over two hours. Upon completion of the oxide addition, the reaction mixture was maintained at 175°C. for seven hours, at which time the reaction mixture was cooled to 25°C. and discharged from the autoclave. The reaction product was stripped at 100°C. for one hour under less than ten millimeters of mercury to remove unreacted ethylene oxide. The product, a clear golden yellow liquid, had a hydroxyl number of 35.3, an acid number of 0.3, a refractive index at 25°C. of 1.4547 and a Brookfield viscosity at 25°C. of 1420 cps.

B. Preparation Of Graft Copolymer Dispersions

A series of graft copolymer dispersions was prepared in the manner described below. A reaction vessel equipped as described above was charged with the unsaturated polyether-ester polyol prepared in (A), above, hereinafter referred to as Polyol I, a saturated polyol which has a molecular weight of 4800 and is prepared by capping with ethylene oxide the propylene oxide adduct of glycerol and propylene glycol (mole ratio of glycerol to propylene glycol of 3.2:1), said polyol having an oxyethylene content of approximately 13% by weight based on the weight of the polyol, hereinafter referred to as Polyol A, azobis-(isobutyronitrile), n-dodecylmercaptan (DDM) and various vinyl monomers. Nitrogen was bubbled through the charge for about twenty minutes and the charge was heated to about 80°C. After about ten minutes the original transparent solution turned opaque and the exotherm of the polymerization was sufficient to maintain the temperature of the reaction around 80°C. The reaction vessel was maintained at 80°C. for about four hours and thereafter stripped for twenty minutes at 80°C. under less than 5 millimeters of mercury. The ingredients employed, amounts thereof as well as the resulting graft copolymer dispersions are presented in Table I, below.

5050 parts of a 2240 equivalent weight polyol prepared by capping with ethylene oxide a propylene oxide adduct of trimethylolpropane, said polyol having an oxyethylene content of 15% by weight of the polyol and a hydroxyl number of 25. Following the procedure described in Example I, 198 parts of ethylene oxide was then added to the charge at 175°C. for a period of two hours. The reaction temperature was maintained at 175°C. for eleven hours, cooled to 25°C. and discharged from the vessel. The reaction product was stripped at 100°C. for one hour under less than ten millimeters of mercury. The product, a clear liquid had a hydroxyl number of 12.5, an acid number of 0.08 and a Brookfield viscosity at 25°C. of 1490 cps.

B. Preparation Of Graft Copolymer Dispersions

A series of graft copolymer dispersions was prepared in the manner described in Example I, above. Thus, all ingredients were charged to a reaction vessel and heated to 80°C.–85°C. Time of the reaction was about four hours. In all cases, the unsaturation-containing polyol employed was that described in (A), above, hereinafter referred to as Polyol II. Other ingredients employed were a 3000 molecular weight propylene oxide adduct of glycerine (Polyol B), dodecylmercaptan (DDM), azobis(isobutyronitrile) (AIBN) and various vinyl monomers. The ingredients employed, amounts thereof as well as the resulting graft copolymer dispersions are presented in Table II, below.

TABLE I

| Example | Polyol I Parts | Polyol A Parts | Sty | ACN | VCl₂ | VAc | Catalyst Part | DDM Part | Graft Copolymer Dispersion Viscosity Cps | Appearance |
|---|---|---|---|---|---|---|---|---|---|---|
| I | — | 100 | 12.5 | 12.5 | — | — | 0.125 | 0.25 | — | Paste |
| II | 10 | 90 | 12.5 | 12.5 | — | — | 0.125 | 0.25 | 5600 | White stable dispersion. |
| III | 25 | 75 | 12.5 | 12.5 | — | — | 0.125 | 0.25 | 2215 | White stable dispersion. |
| IV | 25 | 75 | 12.5 | — | 12.5 | — | 0.125 | 0.25 | 1376 | Clear stable dispersion. |
| V | 50 | 50 | 12.5 | 12.5 | — | — | 0.125 | 0.25 | 2090 | White stable dispersion. |
| VI | 25 | 75* | 15 | 10 | — | — | 0.062** | 0.125 | Not determined. | White stable dispersion. |
| VII | 25 | 75 | — | — | — | 28.5 | 0.15 | 0.25 | 1740 | Clear stable dispersion. |
| VIII | 25 | 75 | 15 | 10 | — | 5 | 0.15 | 0.3 | 2130 | White stable dispersion. |
| IX | 25 | 75 | — | — | 20 | 5 | 0.250 | 0.20 | 2120 | Clear light brown dispersion. |

Sty = Styrene
ACN = Acrylonitrile
VCl₂ = Vinylidene chloride
VAc = Vinyl acetate
*Polyol was a 3000 molecular weight propylene oxide adduct of glycerol.
**Catalyst was benzoyl peroxide.

EXAMPLES X-XXI

A. Preparation Of An Unsaturated Polyether-ester Polyol

A reaction vessel equipped as described in Example I was charged with 73.5 parts of maleic anhydride and

TABLE II

| Example No. | Polyol II Parts | Polyol B Parts | Sty | ACN | VCl₂ | EA | MMA | Fyr | AIBN Part | DDM Part | Graft Copolymer Dispersion Viscosity Cps | Appearance |
|---|---|---|---|---|---|---|---|---|---|---|---|---|
| X | 10 | 90 | 20 | 5 | — | — | — | — | 0.125 | 0.25 | 1300 | Stable white dispersion. |
| XI | 25 | 75 | 20 | 5 | — | — | — | — | 0.125 | 0.25 | 2000 | Stable white dispersion. |
| XII | 25 | 75 | 16 | 9 | — | — | — | — | 0.125 | 0.25 | 1900 | Stable white dispersion. |
| XIII | 25 | 75 | — | — | 20 | 5 | — | — | 0.125 | 0.25 | 1320 | Off-white |

TABLE II-continued

| Example No. | Polyol II Parts | Polyol B Parts | Vinyl Monomers, Parts | | | | | | AIBN Part | DDM Part | Graft Copolymer Dispersion | |
| --- | --- | --- | --- | --- | --- | --- | --- | --- | --- | --- | --- | --- |
| | | | Sty | ACN | VCl$_2$ | EA | MMA | Fyr | | | Viscosity Cps. | Appearance |
| XIV | 25 | 75 | — | — | 20 | 5 | — | 3.8 | 0.125 | 0.25 | 1200 | Off-white dispersion. |
| XV | 25 | 75 | — | — | 20 | — | 5 | 2.5 | 0.125 | 0.25 | 1240 | Stable white dispersion. |
| XVI | 10 | 90 | — | — | 20 | — | 5 | 2.5 | 0.125 | 0.125 | 930 | Stable white dispersion. |
| XVII | 5 | 95 | 20 | 5 | — | — | — | — | 0.15 | 0.15 | 1285 | Stable white dispersion. |
| XVIII | 10 | 90 | 20 | 5 | — | — | — | — | 0.15 | 0.08 | 2325 | Stable white dispersion. |
| XIX | 10 | 90 | 25 | — | — | — | — | — | 0.125* | 0.1 | — | Stable white dispersion. |
| XX | 10 | 90** | 15 | 10 | — | — | — | — | 0.125 | 0.25 | 2325 | Stable white dispersion. |
| XXI | 10 | 90** | 20 | 5 | — | — | — | — | 0.125 | 0.09*** | 6550 | Stable white dispersion. |

EA = Ethylacrylate
MMA = Methyl methacrylate
Fyr = Bis(beta-chloroethyl)vinyl phosphonate
 *Benzoylperoxide
 **Polyol A as defined in Example 1
 ***n-Octylmercaptan

EXAMPLE XXII

Preparation Of Graft Copolymer Dispersions

A reaction vessel equipped as described in the previous example was charged with 400 parts of Polyol II, 80 parts of styrene, 20 parts of acrylonitrile, 0.50 part of azobis(isobutyronitrile) and 0.50 part of n-dodecylmercaptan. Under a nitrogen flow, the reaction vessel was heated to 80°C. and the reaction was maintained at 80±5°C. for a period of six hours. The reaction product was cooled to room temperature and thereafter stripped at 80°C. for one hour under a pressure of less than five millimeters of mercury. The resulting stable graft copolymer dispersion was a white liquid having a Brookfield viscosity at 25°C. of 7070 cps.

EXAMPLE XXIII

A. Preparation Of An Unsaturated Polyether-ester Polyol

A stainless steel autoclave equipped with a thermometer, stirrer, nitrogen source, inlet means and heat exchange means was charged with 5009 parts (1.6 moles) of a 3000 molecular weight polyol prepared by the reaction of propylene oxide with glycerol in the presence of potassium hydroxide. The charge was purged with nitrogen and heated to 103°C. With constant stirring, 245 parts (2.5 moles) of maleic anhydride was then added to the charge maintaining the temperature of the charge at 103°C. for fifteen minutes. Then, 290 parts (5.0 moles) of propylene oxide was gradually added to the reaction mixture over 2.5 hours. Upon completion of the oxide addition, the reaction mixture was maintained at 103°C. for 2.5 hours at which time the reaction mixture was cooled to 30°C. and discharged from the autoclave. The reaction product was treated with an adsorbent, filtered to remove the catalyst and stripped at 100°C. for one hour under less than ten millimeters of mercury to remove unreacted propylene oxide. The product, hereinafter referred to as Polyol III, a clear golden yellow liquid, had a hydroxyl number of 52.2, an acid number of 0.6, a refractive index at 25°C. of 1.4544 and a Brookfield viscosity at 25°C. of 1200 cps.

B. Preparation Of Graft Copolymer Dispersion

A reaction vessel equipped as described above was charged with 25 parts of the unsaturated polyetherester polyol prepared in (A), above, 75 parts of Polyol B as described in the previous Examples, 12.5 parts of styrene, 12.5 parts of acrylonitrile, 0.125 part of azobis(isobutyronitrile) and 0.25 part of dodecylmercaptan. The charge was heated to 80°C. and maintained at this temperature for three hours. Thereafter, the reaction product was stripped for thirty minutes at 100°C. under less than 10 millimeters of mercury. The stripped reaction product was a homogeneous white liquid dispersion having a Brookfield viscosity at 25°C. of 4540 cps.

EXAMPLE XXIV

A. Preparation Of An Unsaturated Polyether Polyol

A stainless steel autoclave equipped with a thermometer, stirrer, nitrogen source, inlet means and heat exchange means was charged with 375 parts of a 325 molecular weight polyol prepared by the condensation in the presence of potassium hydroxide of four moles of propylene oxide with one mole of glycerol. The charge was purged with nitrogen and heated to 105°C. With constant stirring, a mixture of 4438 parts of propylene oxide and 127 parts (corresponding to 1.0 mole per mole of product) of allylglycidylether was gradually added to the reaction mixture over ten hours. Upon completion of the oxide addition, the reaction mixture was maintained at 105°C. for four hours. Thereafter, 870 parts of ethylene oxide was added over a period of 1.5 hours at a temperature of 105°C. After the addition was completed, the reaction mixture was maintained at 105°C. for an additional hour. The reaction mixture was cooled to 30°C. and discharged from the autoclave. The reaction product was treated with an adsorbent, filtered to remove the catalyst and stripped at 100°C. for one hour under less than five millimeters of mercury to remove volatiles. The product, hereinafter referred to as Polyol IV, was a clear colorless liquid having a hydroxyl number of 37 and an acid number of 0.015.

B. Preparation Of Graft Copolymer Dispersions

A graft copolymer dispersion was prepared in the manner described in the previous Examples employing the following ingredients and amounts thereof:

| Ingredient | Parts |
| --- | --- |
| Polyol IV | 300 |
| Styrene | 60 |
| Acrylonitrile | 15 |
| Azobis(isobutyronitrile) | 0.38 |
| n-Dodecylmercaptan | 0.38 |

The reaction was carried out for five hours at 90°C. The resulting product was a stable white dispersion having a Brookfield viscosity at 25°C. of 1930 cps.

EXAMPLE XXV

A. Preparation Of An Unsaturated Polyether-ester Polyol

A stainless steel autoclave equipped with a thermometer, stirrer, nitrogen source, inlet means and heat exchange means was charged with 436 parts of a 408 molecular weight polyol prepared by the reaction of five moles of propylene oxide with 2-butene-1,4-diol in the presence of potassium hydroxide. The charge was purged with nitrogen and heated to 105°C. With constant stirring, 4328 parts of propylene oxide was then added to the charge over a period of eight hours maintaining the temperature of the charge at 105°C. After the propylene oxide addition the mixture was reacted for six hours at 105°C. Then, 1043 parts of ethylene oxide was gradually added to the reaction mixture over two hours. Upon completion of the oxide addition, the reaction mixture was maintained at 105°C. for one hour at which time the reaction mixture was cooled to 30°C. and discharged from the autoclave and treated with an adsorbent. The reaction product was stripped at 100°C. for thirty minutes under less than ten millimeters of mercury to remove unreacted propylene oxide. The product, hereinafter referred to as Polyol V, a clear golden yellow liquid, had a hydroxyl number of 30.3, an acid number of 0.01, a refractive index at 25°C. of 1.4545 and a Brookfield viscosity at 25°C. of 850 cps.

B. Preparation Of Graft Copolymer Dispersions

A graft copolymer dispersion was prepared in the manner described in the previous examples employing the following ingredients and amounts thereof:

| Ingredient | Parts |
| --- | --- |
| Polyol V | 300 |
| Styrene | 60 |
| Acrylonitrile | 15 |
| Azobis(isobutyronitrile) | 0.38 |
| n-Dodecylmercaptan | 0.38 |

The reaction was carried out for six hours at 90°C. The resulting product was a stable white dispersion having a Brookfield viscosity at 25°C. of 4910 cps.

EXAMPLE XXVI

Preparation Of Graft Copolymer Dispersions Employing Continuous Addition Procedure A reaction vessel equipped as in Example I was charged with 650 parts of Polyol B, 50 parts of Polyol II, 20 parts of styrene, 5 parts of acrylonitrile, 0.5 part of azobis(isobutyronitrile) and 0.5 part of n-dodecylmercaptan. With good stirring and under a nitrogen flow, the charge was heated to 90°C. A stream of a mixture of 45 parts of acrylonitrile and 180 parts of styrene and a stream of 1.0 part of azobis(isobutyronitrile) and 1.0 part of n-dodecylmercaptan in 50 parts of Polyol II and 250 parts of Polyol B were fed into a KENICS static mixer and continuously added to the charge over a period of ninety minutes at 90°C. Upon completion of the addition, the reaction mixture was maintained at 90°C. for 60 minutes. The reaction mixture was then stripped for one hour at 100°C. under less than five millimeters of mercury. The stripped reaction product was a homogeneous white liquid dispersion having a Brookfield viscosity at 25°C. of 1200 cps. and a hydroxyl number of 45.

EXAMPLE XXVII

A. Preparation Of Unsaturated Polyether-ester Polyols

A reaction vessel equipped as described in the previous Examples was charged with 122 parts of toluene diisocyanate and 0.15 part of dibutyltin dilaurate. With good stirring and under a nitrogen flow, the charge was heated to 65°C. where 115 parts of hydroxypropyl methacrylate was added to the vessel over a period of one hour maintaining the temperature of the reaction between 65°C.–75°C. After the addition was completed, the reaction was allowed to continue at 65°C. for thirty minutes and thereafter the reaction product was cooled to 30°C. and discharged from the vessel. The product was a clear amber-colored liquid. To a vessel was charged 600 parts of a 2240 equivalent weight polyol prepared by capping with ethylene oxide a propylene oxide adduct of trimethylolpropane, said polyol having an oxyethylene content of 15% by weight of the polyol and a hydroxyl number of 25 and 32 parts of the above-described amber liquid. The reactants were stirred at 65°C. for one hour. The resulting product, a clear liquid, is hereinafter referred to as Polyol VI. To another vessel was charged 16 parts of the above-described amber-colored liquid and 450 parts of a 9000 molecular weight polyol prepared by the reaction of ethylene oxide with the propylene oxide adduct of ethylenediamine, said polyol having an oxyethylene content of approximately 20% by weight. The reactants were then heated for one hour at 65°C. The resulting product, a clear liquid, is hereinafter referred to as Polyol VII.

B. Preparation Of Graft Copolymer Dispersions

Following the procedure described in Example I(B), two graft polymer dispersions were prepared employing Polyol VI and Polyol VII as described above. The ingredients employed were as follows:

| Ingredient | Parts |
| --- | --- |
| Polyol VI or VII | 20 |
| Polyol B | 180 |
| Styrene | 40 |
| Acrylonitrile | 10 |

-continued

| Ingredient | Parts |
| --- | --- |
| Azobis(isobutyronitrile) | 0.25 |
| n-Dodecylmercaptan | 0.25 |

In both instances, the reaction was carried out at temperatures between 80°C.–90°C. for a period of six hours. In the case of Polyol VI, the graft copolymer dispersion had a viscosity of 2350 cps. In the case of Polyol VII, the graft copolymer dispersion had a viscosity of 1900 cps.

EXAMPLE XXVIII

A high resiliency polyurethane foam was prepared from the polyol described in Example XVII. The ingredients employed in the preparation as well as the physical properties of the foam are presented below:

| Ingredient | Parts |
| --- | --- |
| Polyol | 300 |
| Water | 9.0 |
| Silicone Surfactant | 3.0 |
| Stannous Octoate | 0.7 |
| Bis(2-N,N-dimethylamino-ethyl)ether | 0.33 |
| 80/20 2,4- 2,6-toluene diisocyanate | 113.4 |
| Physical properties: | |
| Rise time, sec. | 102 |
| Density (core), pcf. | 1.86 |
| tensile strength, psi. | 17.7 |
| Elongation, % | 120 |
| Tear Resistance, pi. | 2.8 |
| Compression load, psi. | |
| 25% deflection | 0.93 |
| 65% deflection | 1.65 |
| Air Flow, cfm. | 0.05 |
| Compression set, % | |
| 50% deflection | 6.1 |
| 90% deflection | 7.2 |

The embodiments of the invention in which an exclusive property or privilege is claimed are defined as follows:

1. In a process for the preparation of graft copolymer dispersions which comprises the in situ polymerization of from 1% to 30% by weight based on the weight of polyol mixture of a vinyl monomer or mixture of said monomers in a co-reactive unsaturation-containing polyol mixture containing from 0.1 mole to 3.0 moles of unsaturation per mole of polyol mixture in the presence of from 0.05% to 5% by weight based on the weight of said vinyl monomer of a free radical catalyst, the improvement which comprises carrying out the polymerization at a temperature below 100°C. and in the presence of from 0.1% to 2% by weight based on the weight of vinyl monomer of an alkyl mercaptan chain transferring agent.

2. The process of claim 1 wherein the polymerization is carried out in a polyol mixture comprising from 5 parts to 50 parts by weight of a polyol containing from 0.1 mole to 3.0 moles of unsaturation and from 95 parts to 50 parts by weight of a polyol essentially free from ethylenic unsaturation.

3. The process of claim 1 wherein the vinyl monomer is styrene, acrylonitrile, vinylidene chloride, vinyl acetate, or mixtures thereof.

4. The process of claim 1 wherein the chain transferring agent is n-dodecylmercaptan.

5. The process of claim 1 wherein the temperature of the reaction is between 60°C. and 90°C.

6. The process of claim 1 wherein the polyol mixture is prepared by the reaction of an alkylene oxide with the reaction product of from one mole to two moles of maleic anhydride with one mole of a polyether polyol having an equivalent weight of from 1000 to 5000.

7. The process of claim 1 wherein the free radical catalyst is azobis(isobutyronitrile).

8. The process of claim 1 wherein the polyol is prepared by the reaction of a polyhydric alcohol having from two to six hydroxyl groups with a mixture of propylene oxide and allyl glycidyl ether.

* * * * *